June 5, 1923.

W. E. SHIVELY

PNEUMATIC TIRE

Filed Aug. 26, 1920

1,457,942

Inventor
Walter E. Shively

Patented June 5, 1923.

1,457,942

UNITED STATES PATENT OFFICE.

WALTER E. SHIVELY, OF AKRON, OHIO, ASSIGNOR TO THE GOODYEAR TIRE & RUBBER COMPANY, OF AKRON, OHIO, A CORPORATION OF OHIO.

PNEUMATIC TIRE.

Application filed August 26, 1920. Serial No. 406,255.

*To all whom it may concern:*

Be it known that I, WALTER E. SHIVELY, a citizen of the United States, residing at Akron, in the county of Summit and State of Ohio, have invented new and useful Improvements in Pneumatic Tires, of which the following is a specification.

My invention relates to improvements in pneumatic tire construction and has particular reference to tires embodying a fabricated carcass of cord or the like.

The invention resides broadly in the construction and aggroupment of the elements which are so arranged as to provide a structure possessing, from an operative standpoint, a higher degree of efficiency and durability than is commonly found in tires embodying the usual construction.

The particular objects sought, together with the advantages inherent in the structure itself, will become apparent from a perusal of the following specification, in the claims of which I have assembled and particularly pointed out certain arrangements and combinations of elements indicative of the spirit of the invention.

Figure 1:
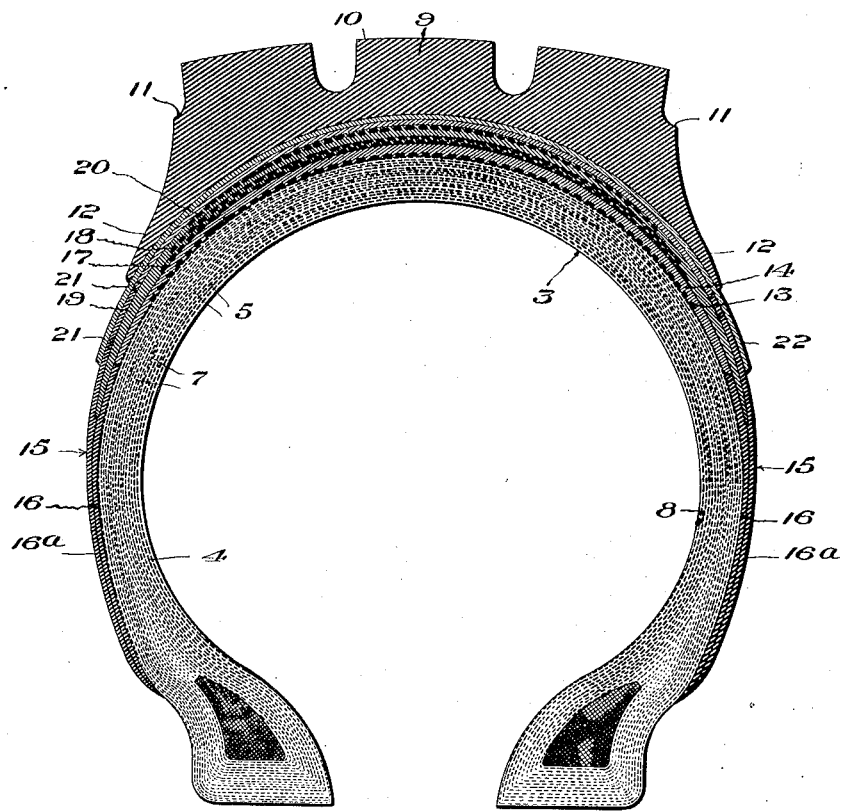
Figure 2:
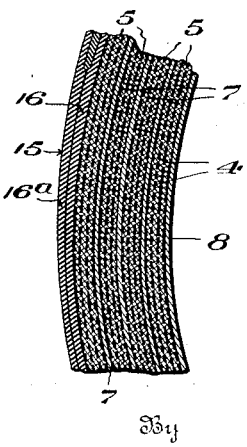

In the accompanying drawing, Figure 1 represents a transverse sectional view of a tire constructed in accordance with my invention, and Figure 2 represents a detail transverse section of a portion of the side wall of the tire.

Referring to the drawings by numerals, 3 designates the carcass portion of the tire which is preferably a fabricated structure of rubberized cord fabric 4, the cords being arranged in sets of superposed layers 5, as best shown in Figure 2 of the drawing. Preferably the cords of the fabric in each set of layers are arranged in parallelism and at an angle of approximately 45° to the plane of the tire, the cords in each succeeding set being arranged to cross the cords of the preceding set at substantially a right angle with respect thereto.

This arrangement of cords needs no further description as is well known in the art and forms no particular part of the present invention which is not restricted to any particular type of carcass construction and may be practiced in combination with a tire carcass formed of the usual woven fabric or the like.

One of the outer layers of each set is provided with an extra skim-coating of rubber or the like, indicated at 7, in order to reduce the friction between the sets of layers. As best shown in Figure 1 of the drawing the coatings 7, preferably, only extend around the carcass to approximately the center of the side walls, it being found unnecessary to extend them further owing to the reduction in the friction occurring in the bead portions of the carcass and the parts adjacent thereto. If desired, a coating 8, of rubber, may also be employed upon the inner wall of the carcass, to reduce the friction between the carcass and the usual inner tube.

Any well known type of tread, of a wear-resisting rubber composition, may be employed in the construction of my novel tire, such, for instance, as that illustrated in the accompanying drawing and designated by the numeral 9. This form of tread embodies a substantially flat road engaging non-skid surface 10, shouldered portions 11, and tapered edge flaps 12, and is described in detail in my co-pending application Serial No. 406,257, filed Aug. 26, 1920.

In building the remaining structure of my tire, after the carcass has been built, I first arrange upon the tread portion of the carcass a breaker strip 13, of coarse woven rubberized fabric, that approximates in width the distance between the edges of the flaps 12, after the tread has been applied. Upon this breaker strip 13, I superpose a cushion strip 14 of soft rubber or rubber composition, which overlaps the edges of the breaker strip, as shown in the drawings, and has its edges abutting the respective inner layers of the side walls 15. The side walls 15 comprise, respectively, two layers 16 and 16$^a$, which are formed of a rubber compound suitable for producing a wear resisting as well as a flexible cover for the side portions of the carcass. Upon the cushion strip 14, I next superpose a double breaker strip formed of two layers 17 and 18 of fabric similar in construction to that of the strip 13, and upon this double breaker strip I arrange a second cushion strip 19 of a slightly harder composition of rubber than the cushion 14. It will be noted that the outer layer 18 of the double breaker strip is of less width than the layer 17, and that the latter strip is of less width than the breaker strip 13. The second cushion strip 19 preferably overlaps the respective outer edges of the inner layers 16 of the side walls, and is in turn overlapped, as shown in Figure 1, by the outer edges of the side wall layer 16ª.

A third breaker strip 20, of similar construction to those previously described, is arranged upon the outer portion of the cushion strip 19 and a cover element, of a less resilient composition of rubber than the second cushion strip 19, is arranged contiguous the strip 20, as indicated at 21. The breaker strip 20, as shown, is of less width than the preceding breaker strips and the cover element 21 is so designed that its edges project beyond the breaker strip 20 to points respectively in alignment with the edges of the tread flaps 12 and the edges of the first breaker strip 13, where they abut the respective outer edges of the outer side wall layers 16ª. If desired, the breaker strip 20 and the cover element may be joined at their edges to their respective contiguous side wall layers 16 and 16ª before the tire is built. Before assembling the tread 9 and the carcass structure and elements previously described, I prefer to utilize an under tread element 22 formed of a strip of rubber composition of relatively less resiliency than that of the cover element 20, but of greater resiliency than the tread member 9. The edges of this latter element, as illustrated in Figure 1, overlap the respective outer layers 16 of the side walls and project beyond the edges of the flaps 12 into approximate horizontal alignment with the edges of the first cushion strip 14.

It will now be apparent that I have provided between the tread member and carcass portion of a tire, a cushioning zone, of graduated degrees of resiliency, that includes a plurality of elements, each of which, starting with the element contiguous the tread member, is composed of rubber of relatively softer composition than its superposed element, certain of the elements overlapping at their edges the layers of a double side wall. Furthermore, I have embodied within this resilient zone a plurality of breaker elements graduated in width, the narrowest element being arranged in proximity to the tread proper and approximating in width the road contacting surface thereof.

In actual practice I have found that, in a tire constructed in accordance with this invention, the shocks and the effects of the deformation of the carcass and tread, due to load and driving thrust, are so distributed and diminished before they reach the carcass as to prevent the localization of stresses and strains along any of the lines of juncture of the several elements. This, obviously, is a material advancement in the tire manufacturing art, inasmuch as it minimizes the liability of separation of the tire elements.

Moreover, the sheering action between adjacent elements of tires, as heretofore constructed, which is due to changes in the curvature of the elements when the tire is compressed, is reduced to a minimum by my present invention. Furthermore, the overlapping of certain of the elements with the layers of a double side wall, provides for a material reinforcement at those portions of the carcass adjacent the edges of the tread where the maximum flexing action of the carcass usually occurs.

While I have shown and described a preferred embodiment of my invention, it is to be understood that various changes in form and modification of structure may be resorted to without departing from the scope of the appended claims.

What I claim is:

1. A pneumatic tire including a fabricated carcass and a tread portion, said tire being constructed to provide a zone of graduated resiliency between the carcass and the tread, and a plurality of breaker elements arranged at intervals within said zone.

2. A pneumatic tire including a fabricated carcass and a tread portion, said tire being constructed to provide a zone of graduated resiliency between the carcass and the tread, and a plurality of breaker elements arranged in superposed spaced relation within said zone.

3. In a pneumatic tire including a fabricated carcass and a tread portion, a resilient element for joining the carcass and the tread portion together, said element increasing progressively in resiliency toward its juncture with the carcass, and a plurality of breaker elements arranged in superposed spaced relation within the resilient element.

4. In a pneumatic tire including a fabricated carcass and a tread portion, a resilient element for joining the carcass and the tread portion together, said element increasing progressively in resiliency toward its juncture with the carcass, a plurality of breaker elements arranged in superposed spaced relation within the resilient element, and side walls constructed of layers, the respective outer edges of which are disposed between the respective edges of said resilient element.

5. In a pneumatic tire including a fabricated carcass and a tread portion, a resilient element for joining the carcass and tread together comprising superposed layers increasing respectively in resiliency toward the junction of said element and carcass, and a plurality of breaker elements arranged in superposed relation within said resilient element.

6. In a pneumatic tire including a fabricated carcass and a tread portion, a resilient element for joining the carcass and tread portion together, said element increasing progressively in resiliency toward its juncture with the carcass portion, and a plurality of breaker strips arranged in superposed relation within the element, said strips decreasing respectively in width toward the tread portion.

7. In a pneumatic tire including a fabricated carcass and a tread portion, a resilient element for joining the carcass and tread portion together, said element increasing progressively in resiliency toward its juncture with the carcass portion, a plurality of breaker strips arranged in superposed relation within the element, said strips decreasing respectively in width toward the tread portion, and side walls constructed of layers, the respective outer edges of which are spliced within the edges of said resilient element.

8. In a pneumatic tire casing including a fabricated carcass and a tread element, a plurality of superposed substantially crescent shaped cushion elements of relatively different degrees of resiliency disposed between the carcass and the tread element, and side walls for the carcass comprising respectively superposed layers, the outer edge portions of the side wall layers and the edge portions of the cushion elements being arranged in overlapping relation.

9. In a pneumatic tire casing including a fabricated carcass and a tread element, a plurality of superposed substantially crescent shaped cushion elements successively decreasing in resiliency and disposed between the carcass and the tread element, and side walls for the carcass comprising respectively superposed layers the outer edge portions of the side wall layers and the edge portions of the cushion elements being arranged in overlapping relation.

In witness whereof, I have hereunto signed my name in the presence of two subscribing witnesses.

WALTER E. SHIVELY.

Witnesses:
L. M. HARTMAN,
J. E. KEATING.